United States Patent

[11] 3,587,690

| [72] | Inventor | Charles Benjamin Peak<br>Geneseo, Ill. |
|---|---|---|
| [21] | Appl. No. | 867,674 |
| [22] | Filed | Oct. 20, 1969 |
| [45] | Patented | June 28, 1971 |
| [73] | Assignee | Deere & Company<br>Moline, Ill. |

[54] COMBINE STRAW CHOPPER MOUNTING
7 Claims, 3 Drawing Figs.

[52] U.S. Cl................................................. 146/117,
130/27
[51] Int. Cl...................................................... B26d
[50] Field of Search............................................ 146/117,
123, (Straw Cutters Digest); 130/27.19, 26, 24

[56] References Cited
UNITED STATES PATENTS
2,280,677  4/1942  Wagner et al.................  130/27
2,815,781  12/1957  Myrold et al.................  146/117
2,954,812  10/1960  Gronbers.......................  146/123

Primary Examiner—Antonio F. Guida
Attorneys—H. Vincent Harsha, Harold M. Knoth, William A. Murray and John M. Nolan ABSTRACT: A combine has a rearward downwardly open hood and a bank of straw walkers within the hood. A straw chopper is suspended below the rearward end of the hood and receives the straw falling over the rearward end of the straw walkers, chopping the straw and discharging it rearwardly. The straw chopper is suspended from the hood by means of an improved mounting arrangement which permits the straw chopper to be mounted higher in the hood for greater clearance under the chopper and also permits relatively easy installation and removal of the chopper. The mounting device includes front and rear pairs of fore-and-aft rails on opposite sides of the hood, the front rails being offset below the rear rails. The respective rails are engaged by front and rear pairs of suspension brackets on the opposite sides of the chopper.

PATENTED JUN28 1971 3,587,690
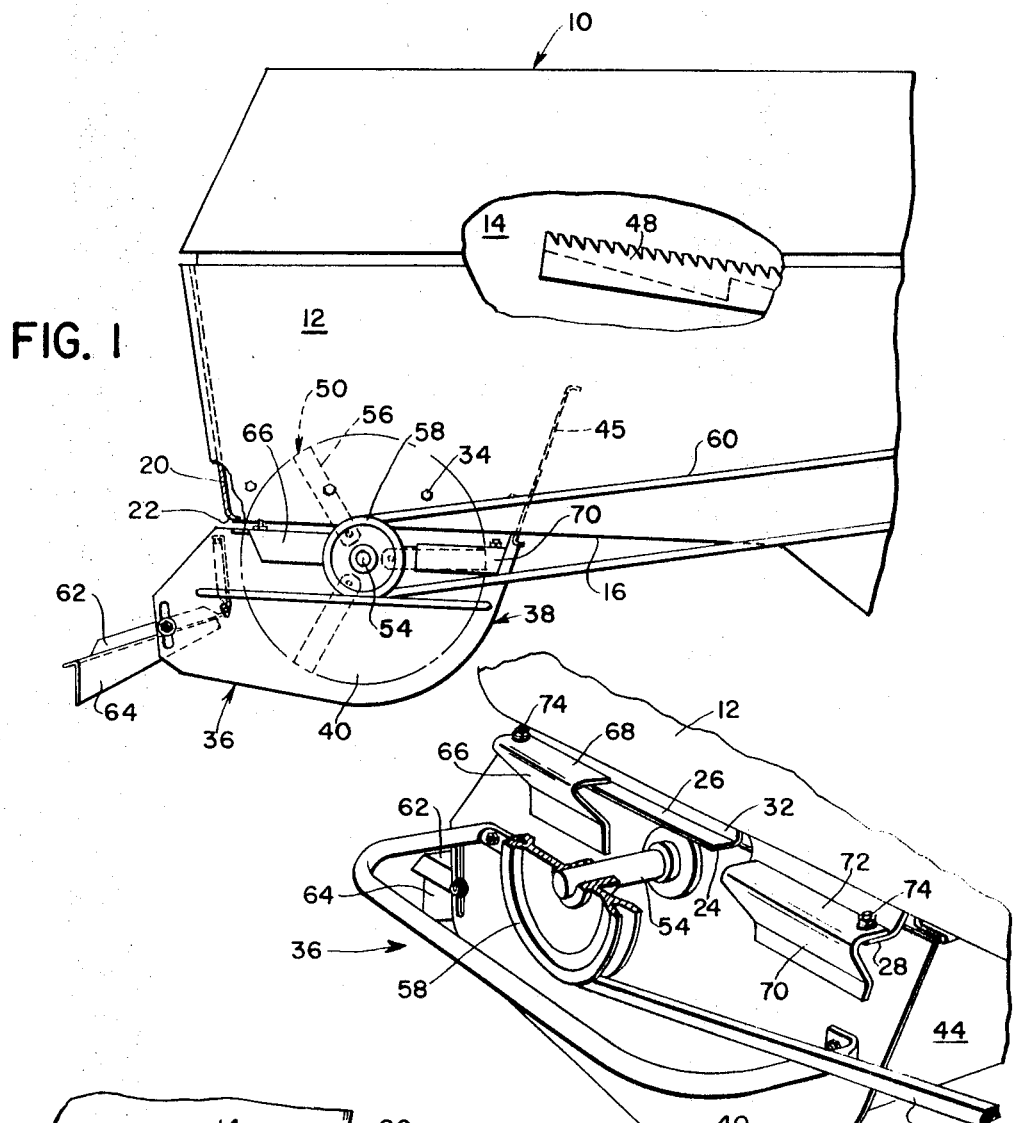
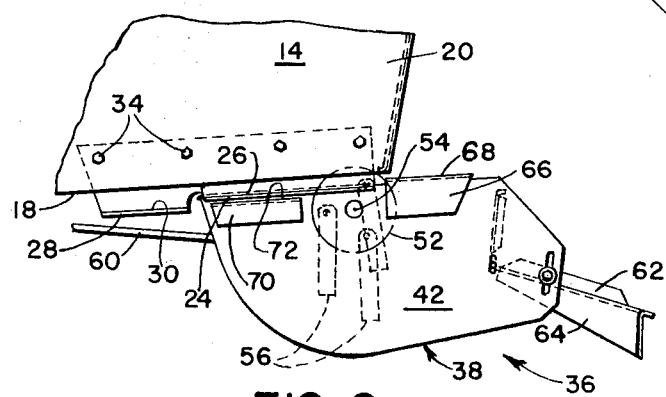
*INVENTOR.*
CHARLES B. PEAK 3,587,690

COMBINE STRAW CHOPPER MOUNTING

BACKGROUND OF THE INVENTION

This invention relates to an improved device for removably mounting a straw chopper on a combine.

When a combine is used to harvest grain or soy beans, some type of straw distributing device is conventionally provided for dispersing the straw as it leaves the combine. In normal straw conditions, a straw spreader is adequate to spread the straw sufficiently so that it creates no problem during later tillage operations. However, when the straw or crop residue is thick, a straw chopper is preferably used in place of the straw spreader to reduce the crop residue before it is spread so that the crop residue does not later cause tillage problems.

A combine conventionally has a rearward downwardly open hood from which the straw or crop residue falls after moving over the straw walker within the hood, and the straw choppers are conventionally mounted under the rearward end of the hood in crop-receiving relationship with the rearward discharge end of the straw walkers. The straw choppers typically include an axially transverse rotor having flail-type knives or hammers, which engage and reduce the straw falling out the bottom of the hood and then disperse the reduced crop rearwardly. Preferably, the means for mounting the straw chopper on the combine permits easy mounting or removal of the straw chopper. One type of mounting device has utilized a pair of fore-and-aft rails attached to the opposite sides of the combine along the lower edges of the hood side panels, a pair of fore-and-aft channellike brackets on the opposite sides of the straw chopper being engageable with and slidable on top of the rails. Thus, the chopper could be lifted so that the forward end of the brackets engaged the rearward end of the rails and then slid forwardly along the rails until it reached the proper position beneath the straw walkers. However, this type of mounting has one disadvantage in that the chopper had to be suspended low enough so that the chopper rotor cleared the lower edge of the rear wall of the hood as the chopper was slid forwardly into position. This, of course, reduced the clearance under the chopper and the chopper drive.

SUMMARY OF THE INVENTION

According to the present invention, an improved mounting means is provided for removably mounting a straw chopper on a combine. More specifically, a straw chopper mounting is provided that permits easy mounting and removal of the straw chopper, while also permitting at least a portion of the chopper rotor to be disposed above the level of the lower edge of the hood rear wall, so that the chopper can be mounted higher within the hood to improve the appearance and ground clearance of the chopper and its belt drive.

An important feature of the invention resides in the use of two pairs of mounting rails on opposite sides of the combine hood, the forward pair of rails being offset below the rearward pair of rails and each pair of rails being engageable by separate mounting brackets on the straw chopper, whereby the chopper can be easily mounted on the rails by sliding the chopper along the rails a relatively short distance. Thus, at least a portion of the chopper rotor can be placed within the hood above the level of the lower edge of the rear wall before the brackets engage the rails, thereby allowing the chopper to be mounted higher within the hood.

BRIEF DESCRIPTION OF THE DRAWINGS

FIG. 1 is a right side elevation view of the rearward portion of a combine with a straw chopper mounted on the combine hood in operating position.

FIG. 2 is a left side elevation view of the rearward portion of a combine showing the position of the chopper during its mounting prior to the engagement of the brackets on the chopper with the rails on the combine.

FIG. 3 is a partial right side front perspective view of the straw chopper mounted on the combine.

DESCRIPTION OF THE PREFERRED EMBODIMENT

The invention is embodied in a combine, only the rearward hood 10 of which is shown in the drawings. The hood 10 represents more or less conventional combine construction and is open toward the bottom, the straw and other crop residue falling out the bottom of the hood after the grain is separated. The hood has opposite right and left generally upright sidewalls 12 and 14 respectively with generally fore-and-aft lower edges 16 and 18 and a generally upright rear wall 20, extending between the rearward ends of the sidewalls and having a lower edge 22 extending between the rearward ends of the lower edges of the sidewalls. It is to be understood that the terms "right" and "left," as well as such terms as "forward," "rearward," etc. are with respect to a person facing in the direction of machine travel (to the right in FIG. 1).

A pair of rear rails 24 respectively project outwardly from the opposite sidewalls adjacent to the lower edges 16 and 18, the rails 24 being elongated and extending in a generally fore-and-aft direction and having generally horizontal upper bearing or support surfaces 26. Similarly, a pair of front rails 28 project outwardly from the opposite sidewalls immediately in front of the rear rails 24 and have upper support or bearing surfaces 30, the front rails also being elongated and extending in a fore-and-aft direction parallel to and slightly below the level of the rear rails. The front and rear rails on each side of the hood are formed by outwardly extending flanges at the bottom of a generally upright plate 32 attached to the side of the hood by fasteners 34.

A straw chopper 36 is mounted below the open bottom of the hood 10 adjacent the rear wall and typically includes a housing 38, which is open toward the top and communicates with the open bottom of the hood. The housing is formed by generally upright right and left sidewalls 40 and 42 respectively and an arcuate wall 44 extending between the sidewalls and enclosing both the bottom and the front of the chopper housing, the arcuate wall 44 being concave upwardly and rearwardly. The arcuate wall 44 includes an upper tangentially extending portion 45, which extends upwardly into the hood and terminates just below and slightly forwardly of the discharge end of a bank of straw walkers 48. The straw walkers 48 are of conventional construction and are only partly shown in FIG. 1.

The crop moving over the rearward discharge end of the straw walkers falls into the chopper housing 38, wherein it is engaged by an axially transverse chopper rotor 50, which typically includes a generally cylindrical core 52 mounted on an axially transverse shaft 54 having its opposite ends journaled in the opposite sidewalls. A relatively large number of flails or knives 56 are swingably mounted on the rotor core 52, the arcuate portion of the wall 44 being concentric with and proximate to the periphery of the rotor when the knives are extended, as shown in FIG. 1. The knives, of course, are extended by centrifugal force and hang downwardly, as shown in FIG. 2, when the rotor is at rest. The rotor is driven by a drive sheave 58 mounted on the shaft 54 adjacent the right housing wall 40, the drive sheave 58 in turn being driven by a belt 60, which is connected to and driven by the combine engine through a series of belt drives in the usual manner. The rotor is driven in a clockwise direction when viewed from the right side of the machine, as shown in FIG. 1, so that the straw or the like is impelled tangentially rearwardly after engagement with the rotor knives. An adjustable deflector board 62 extends between the rearward ends of the sidewalls 40 and 42 of the chopper housing and deflects the crop material downwardly as it leaves the rotor. A number of fins 64 are conventionally provided on the underside of the deflector board 62 to direct the straw outwardly as it moves along the underside of the deflector board, so that the chopped straw is dispersed in a relatively wide band.

The chopper 36 is suspended from the hood 10 by a pair of rear mounting brackets 66, respectively attached to the opposite sidewalls of the straw chopper housing and having laterally extending support elements 68 engageable with the rear mounting rails 24, and a similar pair of front mounting brackets 70, having laterally extending support elements 72 engageable with the front mounting rails 28. As best seen in FIG. 3, the mounting brackets are elongated in a fore-and-aft direction and include a generally vertical lower portion attached to the housing wall, an outwardly and upwardly inclined intermediate portion spaced from the wall, and a transverse angled upper portion which forms the support element, the support elements being generally horizontal and elongated in a fore-and-aft direction. As is apparent from the drawings, the angled portion or support elements 68 of the rear amounting brackets 66 are located at approximately the level of the upper edge of the straw chopper housing sidewalls and abut the upper support surface 26 of the rear rails 24, while the upper portion or support elements 72 of the front mounting brackets are parallel to and offset slightly below the rear mounting bracket support elements 68 and rest on the upper support surface 30 of the front rails 28, when the chopper 36 is suspended under the hood 10 in its operating position, as shown in FIGS. 1 and 3. The straw chopper 36 is removably secured in said operating position by a number of fasteners 74 which secure the respective support elements to the respective mounting rails.

The straw chopper 36 is easily removed by simply removing the belt 60 and the fasteners 74 and then sliding the straw chopper rearwardly until the support elements 68 of the rear mounting brackets 66 clear the rear rails 24 and the support elements 72 of the front mounting brackets 70 clear the front rails 28, as shown in FIG. 2, at which time the straw chopper can be lowered away from the hood. As is apparent from FIG. 2, the support elements 72 of the front brackets 70 move under the rear rails 24, the vertical offset between the front and rear rails accommodating the thickness of the support elements 72 on the front brackets. As is also apparent from FIG. 2, the upper portion of the rotor core 52 is above the level of the lower edge 22 of the rear wall 20, so that the straw chopper 36 cannot be moved rearward relative to the hood any further than the illustrated position.

Conversely, to mount the straw chopper on the combine, the straw chopper is first elevated to the position shown in FIG. 2, wherein the upper portion of the rotor core 52 is immediately inside the lower edge of the rear hood wall 20 and the support elements of the respective mounting brackets are immediately rearward of the respective mounting rails. The chopper is then shifted forwardly so that the support elements 68 engage the front end of the rear rails 24 and the support elements 72 engage the front ends of the front rails 28. The straw chopper is then slid forwardly along the rails until its reaches its operating position as shown in FIG. 1, wherein it is secured by the fasteners 74. As is apparent, the above procedure is simple and can be quickly and easily accomplished. As is also apparent, the offset arrangement of the front and rear mounting rails requires a lesser amount of sliding movement than if a single rail were used to support the straw chopper, and the lesser amount of fore-and-aft movement permits a portion of the chopper rotor to extend above the level of the lower edge of the rear wall, since the rotor can be positioned interiorly of the rear wall before the fore-and-aft sliding movement of the straw chopper and does not have to clear the rear wall.

I claim:
1. In a combine having a rearward downwardly open hood having opposite, upright sidewalls with generally fore-and-aft lower edges, and a generally upright rear wall extending between the rearward end of the sidewalls and having a transverse lower edge extending between the lower edges of the side walls, and straw walker means having a rearward discharge end within the hood, the improvement comprising: a first pair of mounting rails respectively mounted on the opposite sidewalls of the hood proximate to the rear wall and having support surfaces; a second pair of mounting rails respectively mounted on the opposite sidewalls forwardly of the first mounting rails and having support surfaces below the level of the support surfaces on the first pair of mounting rails; a straw chopper including an upwardly open housing with opposite upright sidewalls, an axially transverse rotor journaled in and extending between the sidewalls, a first pair of mounting brackets respectively mounted on the opposite sidewalls of the housing and having support elements respectively engageable with the support surfaces on the first pair of mounting rails, and a second pair of mounting brackets respectively mounted on the opposite sidewalls of the housing forwardly of the first pair of mounting brackets and having support elements respectively engageable with the support surfaces of the second pair of mounting rails, the straw chopper being shiftable between a rearward unsupported position, wherein the support elements of the first and second pairs of mounting brackets respectively clear the support surfaces of the first and second pair of mounting rails, and a forward mounted position, wherein the support elements of the first and second pairs of mounting brackets respectively engage the support surfaces of the first and second pairs of mounting rails to support the chopper under the hood with the chopper rotor in a crop-receiving relationship with the discharge end of the straw walkers; and fastening means operative to removable secure the straw chopper to the mounting rails in said forward mounted position.

2. The invention defined in claim 1 wherein the rotor is at least partially disposed within the hood in said rearward unsupported position, at least a portion of the rotor being disposed above the level of the lower edge of the rear wall of the hood.

3. The invention defined in claim 2 wherein the support surfaces of the mounting rails are elongated and generally fore-and-aft extending, the support elements of the mounting brackets slidably engaging the respective support surfaces as the chopper is shifted between its alternate positions.

4. The invention defined in claim 3 wherein the mounting rails are mounted generally parallel and adjacent to the lower edges of the opposite sidewalls.

5. The invention defined in claim 4 wherein the support surfaces of the mounting rails are horizontal and disposed exteriorly adjacent to the opposite sidewalls.

6. The invention defined in claim 5 wherein the mounting brackets are attached to the exterior sides of the chopper housing sidewalls and the supporting elements are horizontal and elongated in fore-and-aft direction and are disposed adjacent the upper edges of the chopper housing sidewalls.

7. The invention defined in claim 6 wherein the supporting elements of the second pair of mounting brackets are respectively disposed below the first pair of mounting rails when the straw chopper is in its rearward position.

UNITED STATES PATENT OFFICE
CERTIFICATE OF CORRECTION

Patent No. 3,587,690              Dated   28 June 1971

Inventor(s)   Charles Benjamin Peak

It is certified that error appears in the above-identified patent and that said Letters Patent are hereby corrected as shown below:

Col. 4, line 35, change "removable" to -- removably --;

line 50, change "opposite" to -- hood --.

Signed and sealed this 21st day of December 1971.

(SEAL)
Attest:

EDWARD M. FLETCHER, JR.          ROBERT GOTTSCHALK
Attesting Officer                Acting Commissioner of Patents